(12) United States Patent
Arngren et al.

(10) Patent No.: US 10,311,038 B2
(45) Date of Patent: Jun. 4, 2019

(54) METHODS, COMPUTER PROGRAM, COMPUTER PROGRAM PRODUCT AND INDEXING SYSTEMS FOR INDEXING OR UPDATING INDEX

(71) Applicant: TELEFONAKTIEBOLAGET LM ERICSSON (PUBL), Stockholm (SE)

(72) Inventors: Tommy Arngren, Södra Sunderbyn (SE); Tim Kornhammar, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 501 days.

(21) Appl. No.: 14/915,408

(22) PCT Filed: Jan. 13, 2014

(86) PCT No.: PCT/SE2014/050027
§ 371 (c)(1),
(2) Date: Feb. 29, 2016

(87) PCT Pub. No.: WO2015/030645
PCT Pub. Date: Mar. 5, 2015

(65) Prior Publication Data
US 2016/0217171 A1    Jul. 28, 2016

Related U.S. Application Data

(60) Provisional application No. 61/871,460, filed on Aug. 29, 2013.

(51) Int. Cl.
*G06F 17/30* (2006.01)
*G06F 16/23* (2019.01)
(Continued)

(52) U.S. Cl.
CPC .......... *G06F 16/2322* (2019.01); *G06F 16/22* (2019.01); *G06F 16/24578* (2019.01);
(Continued)

(58) Field of Classification Search
None
See application file for complete search history.

(56) References Cited

U.S. PATENT DOCUMENTS

| 5,678,040 A | 10/1997 | Vasudevan et al. |
| 5,832,495 A | 11/1998 | Gustman |

(Continued)

FOREIGN PATENT DOCUMENTS

| EP | 1 024 437 A2 | 8/2000 |
| EP | 1 220 541 A2 | 7/2002 |

(Continued)

OTHER PUBLICATIONS

Final Office Action for U.S. Appl. No. 13/559,258, dated Sep. 9, 2016, 39 pages.
(Continued)

*Primary Examiner* — Belix M Ortiz Ditren
(74) *Attorney, Agent, or Firm* — Rothwell, Figg, Ernst & Manbeck, p.c.

(57) ABSTRACT

Methods, indexing systems, computer program, computer program product for indexing and searching content are disclosed. For example, in one embodiment a method performed by an indexing system (104) for indexing or updating an index (106) for content is disclosed. The method includes for each one of a plurality of keywords (204) in a data storage system (1206), wherein each keyword is associated with a modality (206) and at least a first time stamp (208): retrieving (1002) from the data storage system a keyword (204a) and its associated first time stamp (208a); defining a time range for the keyword; determining which other keywords (214a) in the data storage system are associated with a time stamp within the time range; and updating the index with said other keywords that were determined to be associated with a time stamp within the time range.

29 Claims, 14 Drawing Sheets

(51) Int. Cl.
   *G06F 16/22*      (2019.01)
   *G06F 16/2457*    (2019.01)
   *G06F 16/78*      (2019.01)
   *G06F 16/783*     (2019.01)
   *G06F 16/71*      (2019.01)

(52) U.S. Cl.
   CPC .......... *G06F 16/71* (2019.01); *G06F 16/7844* (2019.01); *G06F 16/7867* (2019.01); *G06F 17/3053* (2013.01); *G06F 17/30312* (2013.01); *G06F 17/30353* (2013.01)

(56) References Cited

U.S. PATENT DOCUMENTS

| | | | |
|---|---|---|---|
| 5,963,940 | A | 10/1999 | Liddy et al. |
| 6,026,388 | A | 2/2000 | Liddy et al. |
| 6,363,380 | B1 | 3/2002 | Dimitrova |
| 6,366,296 | B1 | 4/2002 | Boreczky et al. |
| 6,374,260 | B1 | 4/2002 | Hoffert |
| 6,484,156 | B1 | 11/2002 | Gupta et al. |
| 6,643,643 | B1 | 11/2003 | Lee et al. |
| 7,131,059 | B2 | 10/2006 | Obrador |
| 7,149,359 | B1 | 12/2006 | Omoigui |
| 7,242,810 | B2 | 7/2007 | Chang |
| 7,382,933 | B2 | 6/2008 | Dorai et al. |
| 7,493,312 | B2 | 2/2009 | Liu et al. |
| 7,627,556 | B2 | 12/2009 | Liu et al. |
| 7,676,495 | B2 | 3/2010 | Qian |
| 7,725,453 | B1 | 5/2010 | Chen et al. |
| 8,060,906 | B2 | 11/2011 | Begeja et al. |
| 8,065,301 | B2 | 11/2011 | Ginsburg et al. |
| 8,166,029 | B2 | 4/2012 | Park et al. |
| 8,438,157 | B2 | 5/2013 | Adams, Jr. |
| 8,442,994 | B1 | 5/2013 | Chen et al. |
| 8,566,370 | B2 | 10/2013 | Jin et al. |
| 8,611,422 | B1 | 12/2013 | Yagnik et al. |
| 8,914,632 | B1 | 12/2014 | Shankar et al. |
| 9,292,552 | B2 | 3/2016 | Arngren |
| 9,633,015 | B2 | 4/2017 | Arngren |
| 2001/0047379 | A1 | 11/2001 | Jun et al. |
| 2002/0054083 | A1 | 5/2002 | Boreczky et al. |
| 2002/0097983 | A1 | 7/2002 | Wallace et al. |
| 2002/0161747 | A1 | 10/2002 | Li et al. |
| 2003/0033347 | A1 | 2/2003 | Bolle |
| 2003/0105589 | A1 | 6/2003 | Liu et al. |
| 2003/0107592 | A1 | 6/2003 | Li et al. |
| 2003/0108334 | A1 | 6/2003 | Nevenka et al. |
| 2004/0025180 | A1 | 2/2004 | Begeja et al. |
| 2004/0111432 | A1 | 6/2004 | Adams, Jr. et al. |
| 2004/0162870 | A1 | 8/2004 | Matsuzaki et al. |
| 2004/0215663 | A1 | 10/2004 | Liu et al. |
| 2004/0220925 | A1 | 11/2004 | Liu et al. |
| 2005/0102312 | A1 | 5/2005 | Ohya et al. |
| 2005/0114357 | A1 | 5/2005 | Chengalvarayan et al. |
| 2005/0222981 | A1 | 10/2005 | Lawrence et al. |
| 2005/0265607 | A1 | 12/2005 | Chang |
| 2006/0093190 | A1 | 5/2006 | Cheng et al. |
| 2006/0122984 | A1 | 6/2006 | Byers et al. |
| 2006/0149624 | A1 | 7/2006 | Baluja et al. |
| 2006/0218191 | A1 | 9/2006 | Gopalakrishnan |
| 2006/0282336 | A1 | 12/2006 | Huang |
| 2007/0033515 | A1 | 2/2007 | Sull et al. |
| 2007/0055695 | A1 | 3/2007 | Dorai et al. |
| 2007/0056046 | A1 | 3/2007 | Claudatos et al. |
| 2007/0067304 | A1 | 3/2007 | Ives |
| 2007/0106646 | A1 | 5/2007 | Stern et al. |
| 2007/0106660 | A1 | 5/2007 | Stern et al. |
| 2007/0220025 | A1 | 9/2007 | Hyman |
| 2007/0250810 | A1 | 10/2007 | Tittizer et al. |
| 2008/0016101 | A1 | 1/2008 | Ginsburg et al. |
| 2008/0016293 | A1 | 1/2008 | Saika |
| 2008/0086688 | A1 | 4/2008 | Chandratillake et al. |
| 2008/0109881 | A1 | 5/2008 | Dasdan |
| 2008/0112690 | A1 | 5/2008 | Shahraray et al. |
| 2008/0124055 | A1 | 5/2008 | Shahraray et al. |
| 2008/0232775 | A1 | 9/2008 | Ljolje |
| 2008/0310628 | A1 | 12/2008 | Fujioka et al. |
| 2009/0006368 | A1 | 1/2009 | Mei |
| 2009/0019034 | A1 | 1/2009 | Franks et al. |
| 2009/0041356 | A1 | 2/2009 | Barbieri et al. |
| 2009/0110296 | A1 | 4/2009 | Sekiguchi et al. |
| 2009/0116645 | A1 | 5/2009 | Jeong et al. |
| 2009/0138472 | A1 | 5/2009 | MacLean |
| 2009/0154806 | A1 | 6/2009 | Chang et al. |
| 2009/0210779 | A1* | 8/2009 | Badoiu ............... G06F 17/3082 715/230 |
| 2009/0240674 | A1 | 9/2009 | Wilde |
| 2009/0299725 | A1 | 12/2009 | Grigsby et al. |
| 2009/0300351 | A1 | 12/2009 | Lei et al. |
| 2010/0005121 | A1 | 1/2010 | Benitez et al. |
| 2010/0070485 | A1 | 3/2010 | Parsons et al. |
| 2010/0094630 | A1 | 4/2010 | Yoakum |
| 2010/0138292 | A1 | 6/2010 | Park et al. |
| 2010/0158470 | A1 | 6/2010 | Tzoukermann et al. |
| 2010/0161580 | A1 | 6/2010 | Chipman et al. |
| 2010/0211781 | A1 | 8/2010 | Auradkar et al. |
| 2011/0010372 | A1 | 1/2011 | Sahasrabudhe et al. |
| 2011/0040967 | A1 | 2/2011 | Waller et al. |
| 2011/0047163 | A1 | 2/2011 | Chechik et al. |
| 2011/0072012 | A1 | 3/2011 | Ah-Pine |
| 2011/0154405 | A1 | 6/2011 | Isaias |
| 2011/0208722 | A1 | 8/2011 | Hannuksela |
| 2011/0249956 | A1 | 10/2011 | Komai |
| 2011/0258188 | A1 | 10/2011 | AbdAlmageed et al. |
| 2011/0299721 | A1 | 12/2011 | He et al. |
| 2012/0023084 | A1 | 1/2012 | Lalji et al. |
| 2012/0089580 | A1 | 4/2012 | Yamashita et al. |
| 2012/0110080 | A1 | 5/2012 | Panyam et al. |
| 2012/0124055 | A1 | 5/2012 | Deubel et al. |
| 2012/0158713 | A1 | 6/2012 | Jin et al. |
| 2013/0061035 | A1 | 3/2013 | Hook et al. |
| 2013/0151534 | A1 | 6/2013 | Luks et al. |
| 2013/0166587 | A1* | 6/2013 | Berry ............... G06F 17/30038 707/769 |
| 2013/0219024 | A1 | 8/2013 | Flack |
| 2013/0226930 | A1 | 8/2013 | Arngren et al. |
| 2013/0282687 | A1 | 10/2013 | Ah-Pine et al. |
| 2014/0032538 | A1 | 1/2014 | Arngren et al. |
| 2014/0032562 | A1 | 1/2014 | Arngren et al. |
| 2014/0108020 | A1 | 4/2014 | Sharma et al. |
| 2014/0142958 | A1 | 5/2014 | Sharma et al. |
| 2014/0222755 | A1 | 8/2014 | Söderberg et al. |
| 2014/0229488 | A1 | 8/2014 | Arngren et al. |
| 2015/0234824 | A1 | 8/2015 | Arngren et al. |
| 2015/0312259 | A1 | 10/2015 | Alpha et al. |
| 2016/0085860 | A1 | 3/2016 | Wallenberg et al. |
| 2016/0210443 | A1 | 7/2016 | Arngren et al. |

FOREIGN PATENT DOCUMENTS

| | | |
|---|---|---|
| EP | 1 480 100 A1 | 11/2004 |
| EP | 2216731 A2 | 8/2010 |
| EP | 2323046 A1 | 5/2011 |
| EP | 2 444 921 A2 | 10/2011 |
| EP | 2657884 A2 | 10/2013 |
| WO | 2001/017163 A1 | 3/2001 |
| WO | 02/084980 A1 | 10/2002 |
| WO | 2010/150226 A2 | 12/2010 |
| WO | 2011/104428 A1 | 9/2011 |
| WO | 2012/001216 A1 | 1/2012 |
| WO | 2014/185834 A1 | 11/2014 |
| WO | 2015/030645 A1 | 3/2015 |
| WO | 2015/030646 A1 | 3/2015 |

OTHER PUBLICATIONS

Extended European Search Report for European Patent Application No. 14839431.5, dated Jul. 22, 2016, 9 pages.

Excerpt of Prosecution History of U.S. Appl. No. 13/559,258 Sep. 9, 2016-Dec. 2, 2016 45 pages.

Excerpt of Prosecution History of U.S. Appl. No. 13/408,448 Nov. 1, 2016-May 9, 2014 45 pages.

(56) References Cited

OTHER PUBLICATIONS

Supplementary European Search Report for European Patent Application No. 14893538 dated Mar. 6, 2017, 3 pages.
International Search Report and Written Opinion issued in International Application No. PCT/SE2014/050655, dated Mar. 2, 2015, 15 pages.
Saracoglu, Ahmet et. al.,"Content Based Copy Detection with Coarse, Audio-Visual Fingerprints", 2009 Seventh International Workshop on Content-Based Multimedia Indexing, 2009, IEEE, 6 pages.
Youtube and Shazam homepages retrieved on May 26, 2014, 2 pages.
$9^{th}$ International Workshop on Content-Based Multimedia Indexing (CBMI 2011), homepage, 2 pages, http://www-vpu.eps.uam.es/cbmi2011/.
Excerpt of Prosecution History of U.S. Appl. No. 13/764,219, Aug. 2014-May 2016, 156 pages.
Excerpt of Prosecution History of U.S. Appl. No. 14/184,207, Jun. 2016-May 2017, 124 pages.
International Search Report and Written Opinion of the ISA issued for the corresponding International Patent Application No. PCT/SE2014/050027 dated Nov. 3, 2014, 10 pages.
Non-Final Office Action issued in U.S. Appl. No. 14/914,849 dated Dec. 28, 2017, 27 pages.
Lew, M.S., et al. "Content-Based Multimedia Information Retrieval: State of the Art and Challenges," ACM Transactions on Multimedia Computing, Communications and Applications, vol. 2, No. 1, Feb. 2006, pp. 1-19.
"MPEG-7 Overview," International Organisation for Standardisation, ISO/IEC JTC1/SC29/WG11, Coding of Moving Pictures and Audio, Oct. 2004, pp. 1-95.
Non-Final Office Action for U.S. Appl. No. 13/688,566, dated Sep. 10, 2014, 10 pages.
Non-Final Office Action for U.S. Appl. No. 13/688,566, dated Mar. 12, 2015, 11 pages.
Final Office Action for U.S. Appl. No. 13/688,566, dated Sep. 10, 2015, 16 pages.
Examiner-Initiated Interview Summary for U.S. Appl. No. 13/688,566 dated Nov. 16, 2015, 1 page.
Notice of Allowance for U.S. Appl. No. 13/688,566, dated Dec. 30, 2015, 19 pages.
Non-Final Office Action for U.S. Appl. No. 13/408,448 dated Feb. 6, 2013, 15 pages.
Non-Final Office Action for U.S. Appl. No. 13/408,448 dated Jun. 14, 2013, 19 pages.
Final Office Action for U.S. Appl. No. 13/408,448 dated Dec. 5, 2013, 21 pages.
Non-Final Office Action for U.S. Appl. No. 13/408,448 dated Apr. 7, 2014, 21 pages.
Final Office Action for U.S. Appl. No. 13/408,448 dated Aug. 29, 2014, 28 pages.
Advisory Action for U.S. Appl. No. 13/408,448 dated Nov. 7, 2014, 3 pages.
Weisstein, Eric W. "Probability Axioms," From MathWorld—A Wolfram Web Resource. http://mathworld.wolfram.com/ProbabilityAxioms.html, 1 page.
Examiner's Answer to Appeal Brief for U.S. Appl. No. 13/408,448 dated May 18, 2015, 10 pages.
Non-Final Office Action for U.S. Appl. No. 13/559,258, dated Aug. 15, 2013, 15 pages.
Final Office Action for U.S. Appl. No. 13/559,258, dated Feb. 4, 2014, 20 pages.
Advisory Action for U.S. Appl. No. 13/559,258, dated Apr. 21, 2014, 3 pages.
Non-Final Office Action for U.S. Appl. No. 13/559,258, dated Dec. 31, 2014, 17 pages.
Final Office Action for U.S. Appl. No. 13/559,258, dated Jun. 19, 2015, 23 pages.
Advisory Action for U.S. Appl. No. 13/559,258, dated Aug. 27, 2015, 3 pages.
Non-Final Office Action for U.S. Appl. No. 13/559,258, dated Jan. 20, 2016, 23 pages.
International Search Report and Written Opinion of the ISA issued for International Patent Application No. PCT/SE2013/050536, dated Apr. 10, 2014, 17 pages.
Lawto et al., "A Scalable Video Search Engine Based on Audio Content Indexing and Topic Segmentation," Turin, Italy, Sep. 2011, http://hal.archivesouvertes.fr/docs/00/64/52/28/PDF/NEMSummit2011_final2.pdf [retrieved Apr. 2, 2014], 6 pages.
Yang, W. et al., "Discriminative Tag Learning on YouTube Videos with Latent Sub-tags," in proceeding of The 24th IEEE Conference on Computer Vision and Pattern Recognition, CVPR 2011, Colorado Springs, CO, USA, Jun. 20-25, 2011, pp. 3217-3224.
Garcia, E., "The Term Count Model: Demystifying Term Vector Calculations," Oct. 27, 2006, 7 pages, http://web.archive.org/web/20121029050356/http://www.miislita.com/term-vector/term-vector-2.html.
International Search Report and Written Opinion of the ISA issued for International Patent Application No. PCT/SE2014/050240, dated Dec. 8, 2014, 14 pages.
Cisco Systems, Inc., "Cisco Visual Networking Index: Forecast and Methodology, 2012-2017," Cisco White Paper, May 29, 2013, 15 pages.
Cisco Systems, Inc., "Press Release: Cisco Global Cloud Index Forecasts Cloud Traffic to Grow Sixfold by 2016," retrieved Jul. 8, 2014, dated Oct. 23, 2012, 5 pages.
Cisco Systems, Inc., "Cisco Visual Networking Index: Global Mobile Data Traffic Forecast Update," 2012-2017, Cisco White Paper, Feb. 6, 2013, 34 pages.
www.google.com Print screen of "Obama" search results, Aug. 16, 2013, 3 pages.
Non-Final Office Action issued in U.S. Appl. No. 14/914,849 dated Jul. 27, 2018, 25 pages.
Non-Final Office Action issued in U.S. Appl. No. 14/891,259 dated Aug. 16, 2018, 54 pages.
Non-Final Office Action issued in U.S. Appl. No. 15/312,848 dated Nov. 20, 2018, 32 pages.
Final Office Action issued in U.S. Appl. No. 14/891,259 (3602-603US1) dated Mar. 6, 2019, 22 pages.
Final Office Action issued in U.S. Appl. No. 15/312,848 (3602-1334US1) dated Apr. 2, 2019, 25 pages.

* cited by examiner

| Row Id | Keyword | Modality | Start TS | End TS | Rank | Overlap | Video id |
|---|---|---|---|---|---|---|---|
| 1 | Intro | Text | 2 | 8 | 7.5 | CNN | 1 |
| 2 | CNN 204a | Text | 6 208a | 10 210a | 8.33 | Intro 214a Obama | 1 |
| 3 | Obama | Image | 9 | 12 | 16.25 | CNN flag | 1 |
| 4 | flag | Image | 9 | 14 | 16.25 | CNN Obama | |
| 5 | 204b | | | | | 214b | |
| 6 | | | | | | | |
| 7 | | | | | | | |

| Row Id | Keyword | Modality | Start range | End range | Rank | Video id |
|---|---|---|---|---|---|---|
| 1 | Intro | Text | 3 | 6 | 5 | 1 |
| 2 | CNN | Text | 7 | 9 | 5 | 1 |
| 3 | Obama | Image | 10 | 11 | 10 | 1 |
| 4 | | | | | | |
| 5 | | | | | | |
| 6 | | | | | | |
| 7 | | | | | | |

METHODS, COMPUTER PROGRAM, COMPUTER PROGRAM PRODUCT AND INDEXING SYSTEMS FOR INDEXING OR UPDATING INDEX

CROSS REFERENCE TO RELATED APPLICATION(S)

This application is a 35 U.S.C. § 371 National Phase Entry Application from PCT/SE2014/050027, filed Jan. 13, 2014, designating the United States, which claims priority to U.S. Patent Application No. 61/871,460, filed Aug. 29, 2013. The above identified applications are incorporated by reference.

TECHNICAL FIELD

Disclosed herein are, for example, methods, computer program, computer program product and indexing systems for indexing or updating an index. In one aspect, the disclosure is related to, inter alia, indexing time-based content (e.g., video content, audio content, and audiovisual content) to enable a user to easily find content of interest to the user. The disclosure relates to several embodiments of such a system.

BACKGROUND

The World Wide Web (WWW) grows larger and larger every day, and users access it more often on a daily basis using a variety of devices, such as Personal computers (PC), phones, tablets, cameras and Internet Protocol Television (IP-TV) devices. Mobile technologies make it easier to capture audiovisual content and different social network and video sharing sites make it possible to share such content on the Internet. As technology becomes smarter the sharing of audiovisual content becomes more common. The amount of content is growing rapidly and researchers are working on smarter ways to search, retrieve and share such content.

Today audiovisual content can be searched on web sites, such as YouTube (www.youtube.com, retrieved on Aug. 16, 2013), so-called "play channels" owned by traditional TV broadcasters, Video-on-Demand sites, etc. Videos are stored and tagged using conventional audiovisual metadata like title, description, duration, keywords, video category (like "Action", "Comedy" etc.).

There are a number of commercial search engines available today that use proprietary algorithms for indexing and search. A first example is YouTube (www.youtube.com, retrieved on 16 Aug. 2013). Searching for a specific keyword via YouTube can provide three different types of results: 1) Videos (e.g., a link to a video which is relevant to the search query); 2) Playlists (e.g., link to a playlist, an ordered set of videos, which are relevant to the search query); and 3) Channels (e.g., a link to a channel (user account) which contains videos relevant to the search).

Another example is Vimeo (www.vimeo.com, retrieved on 16 Aug. 2013), wherein the search function is segmented into different types of content, and the user is required to select which type of search results that is expected. By default, a search will display a list of matching videos, but the user is able to select to instead search for people, channels, groups or forum.

Yet another example is Google (www.google.com, retrieved on 16 Aug. 2013). Here a standard web search can present results ordered hierarchically. The most common result on a web search is a list of web pages which match the search query. For each of these, the user can expand to see exactly where in the page the search query is matched. Additionally, relevant pages within the same site are displayed adjacently, with the most relevant result for said site being displayed on top. The Google search engine searches web pages rather than video content.

What is desired is, for example, a search engine system having an improved content indexing system that enables a user to more easily find the content the user is searching for.

SUMMARY

Described herein are various embodiments for indexing or updating an index. An object of at least one embodiment may be to enable improved search accuracy for multimedia content in relation to the prior art mentioned in the background. Another object of at least one embodiment may be to enable more effective techniques for generating accurate search indices for multimedia content. Embodiments of the indexing and searching system disclosed herein use a time range, hereinafter sometimes called Window of Relevance (WoR), associated with keywords (which are also referred to as "tags"). The WoR enables a more effective display of search results in, for example, a graphical user interface (GUI) displayed by a user equipment (UE) (e.g., a computer, smartphone, etc), by displaying at least one word adjacent to a displayed keyword used in a search. The at least one word makes it easier for the user to guess or know if a hit in the search result is relevant or not. Other possible technical advantages is that the implementation of some embodiments of the indexing and search system becomes more dynamic and/or generic by e.g. making the indexing more unrelated to more "stationary segments" and their size. Some embodiments also make the searching multimedia content faster than conventional methods.

In one aspect there is provided a method performed by an indexing system for indexing or updating an index for content. In some embodiments, the method comprises for each one of a plurality of keywords in a data storage system, wherein each keyword is associated with a modality and at least a first time stamp, retrieving from the data storage system a keyword and its associated first time stamp. The method also comprises defining a time range for the keyword and determining which other keywords in the data storage system are associated with a time stamp within the time range. The method further comprises updating the index with the other keywords that were determined to be associated with a time stamp within the time range. The method may also comprise updating the index with a rank value and modality of each one of the determined other keywords with time stamps within the time range.

In some embodiments, the method also comprises, before the step of retrieving the keyword from the data storage system, on at least a plurality of frames of a video: identifying one or more features present in the frames, wherein each one of the features are of at least one modality. The method according to the embodiments also includes identifying, for each identified feature, a keyword associated with the identified feature and generating the at least one time stamp for each one of the identified keywords. The method according to the embodiments further includes storing the keywords and their respective time stamps in the data storage system.

In some embodiments, the time range is defined as starting a certain time before the time of the first time stamp and ending the certain time after the first time stamp.

In some embodiments, the keyword is further associated with a second time stamp and the time range starts a certain time before the time of the first time stamp and ends a certain time after the second time stamp.

In another aspect there is provided an indexing system. The indexing system comprises a computer system and data storage system. The data storage system contains instructions executable by the computer system. The indexing system is operative to, for each one of a plurality of keywords in the data storage system, wherein each keyword is associated with a modality and at least a first time stamp: retrieve from the data storage system a keyword and its associated first time stamp and define a time range for the keyword. The indexing system is further operative to determine which other keywords in the data storage system are associated with a time stamp within the time range. The indexing system is further operative to update an index with the other keywords that were determined to be associated with a time stamp within the time range.

In another aspect there is provided a computer program for indexing content. In some embodiments, the computer program comprises computer readable instructions. The computer readable instructions are configured such that when run on a computer system they cause the computer system to retrieve a keyword from a plurality of keywords stored in a data storage system, wherein the retrieved keyword is associated with a modality and at least a first time stamp, and define a time range for the keyword. The computer readable instructions further cause the computer system to determine which other keywords in the data storage system are associated with a time stamp within the time range. The computer readable instructions further cause the computer system to update an index with the other keywords that were determined to be associated with a time stamp within the time range.

In another aspect there is provided an indexing system for indexing or updating an index for content. In some embodiments, the indexing system comprises means for retrieving from a data storage system a keyword and a time stamp associated with the keyword. The indexing system further comprises means for defining a time range for the keyword. The indexing system further comprises means for determining which other keywords in the data storage system are associated with a time stamp within the time range. The indexing system further comprises means for updating an index with the other keywords that were determined to be associated with a time stamp within the time range.

In another aspect there is provided a content indexing method performed by a indexing and search system. In some embodiments, the method comprises storing in a data storage system a plurality of keywords, the plurality of keywords including a first keyword and a second keyword. The method further comprises defining a time range for the first keyword. The method further comprises, after defining the time range for the first keyword, determining that the second keyword falls within the defined time range. The method further comprises, in response to determining that the second keyword falls within the defined time range, updating a first set of keywords by adding the second keyword to the first set of keywords, wherein the first set of keywords is associated with the first keyword.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

FIG. 2 illustrates an example format for an index according to some embodiments.

FIG. 6 illustrates an example format for an index according to some embodiments.

DETAILED DESCRIPTION

Figure 1:
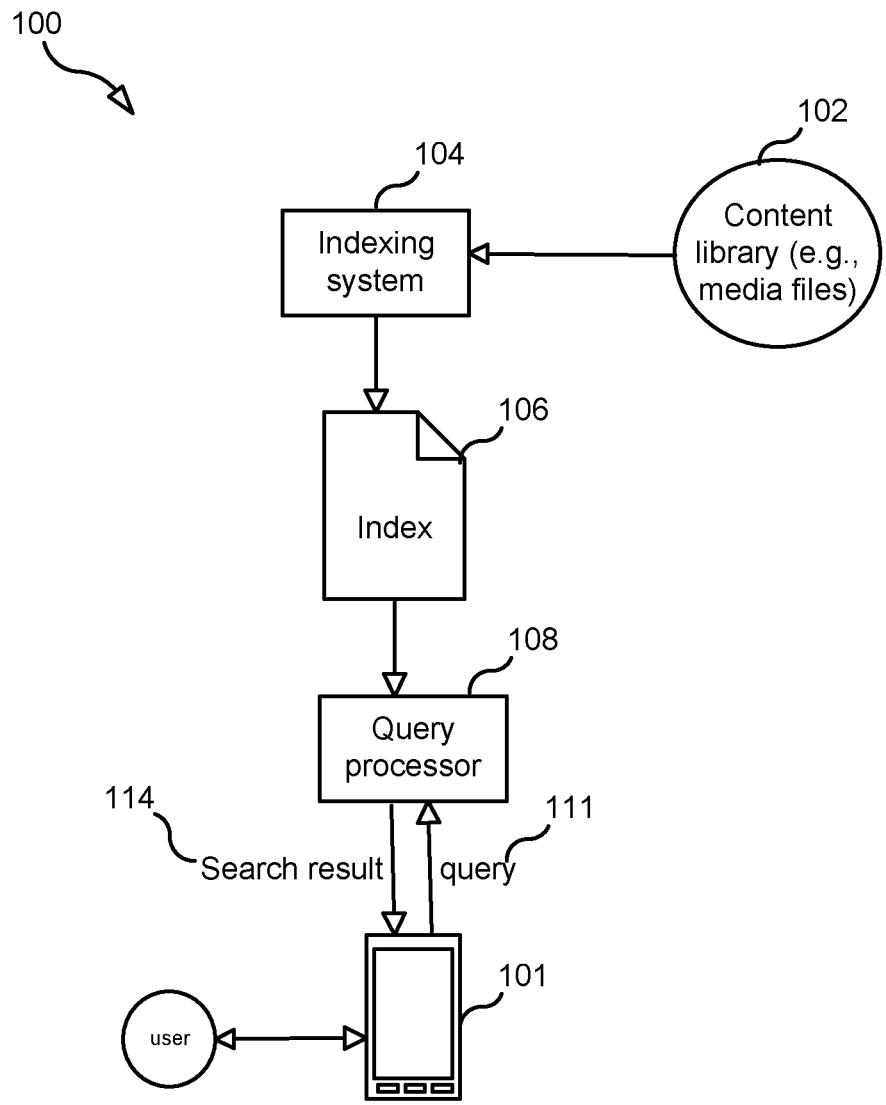
FIG. 1 illustrates functional components of an indexing and search system according to some embodiments.

FIG. 1 illustrates functional components of an indexing and search system 100 according to some embodiments. Indexing and search system 100 includes an indexing system 104 for creating an index 106 based on the contents of a content library 102 (e.g., a set of one or more media files, such as video files containing audiovisual data). For example, index 106 may include a set of records (a.k.a., "vectors") where each record includes: a keyword generated from content within content library 102 and information for locating the content (e.g., a filename or other identifier and a time stamp). Indexing and search system 100 further includes a query processor 108 for: receiving a query 111 input by users of system 100, processing the query by using keyword(s) included in the query and index 106 to find content that matches the user's query, and providing a search result 112 to the user. In some embodiments, indexing and search system 100 is a distributed computer system where at least some of the functions of each functional component are performed by a different computer and the different computers may be remotely located from each other. In other embodiments, indexing and search system 100 is a monolithic computer system where each of the functions of each functional component is performed by one computer. In other embodiments, indexing and search system 100 may be a combination of such computer systems.

FIG. 2 illustrates an example format for index 106 according to some embodiments. As illustrated in FIG. 2, index 106 is an index created for a video library containing one or more videos. As further illustrated in FIG. 2, index 106 may include a set of records 202, where each record includes a keyword 204 and video identifier (video id) 216 identifying a video with which the keyword is associated. Each record 202 may also include other information, such as: a modality identifier 206 identifying a modality with which the keyword is associated (e.g., text, image, audio); a start time stamp ("start TS") 208 identifying a first position (e.g., first frame) within the video; an end time stamp ("end TS") 210 identifying a second position (e.g., second frame) within the video; a rank value 212 identifying a rank for the keyword; and a set 214 of other keywords that overlap with the keyword. For example, record 202a includes a set of values, including among other values: a keyword 204a, a start TS 208a, an end TS 210a, and a set of keywords 214a that overlap keyword 204a; and record 202b includes a set of values, including among other values: a keyword 204b, a start TS 208b, an end TS 210b, and a set of keywords 214b that overlap keyword 204b. More specifically, as FIG. 2 shows, an image of president Obama and an image of a flag appeared in video 1 from position 9 (e.g., frame 9) of video to position 12 (e.g., frame 12) of video 1.

Even though it is not illustrated in index 106, the index 106 may also comprise the ranking/weight value of the respective matching keywords in the list 214.

Figure 3:
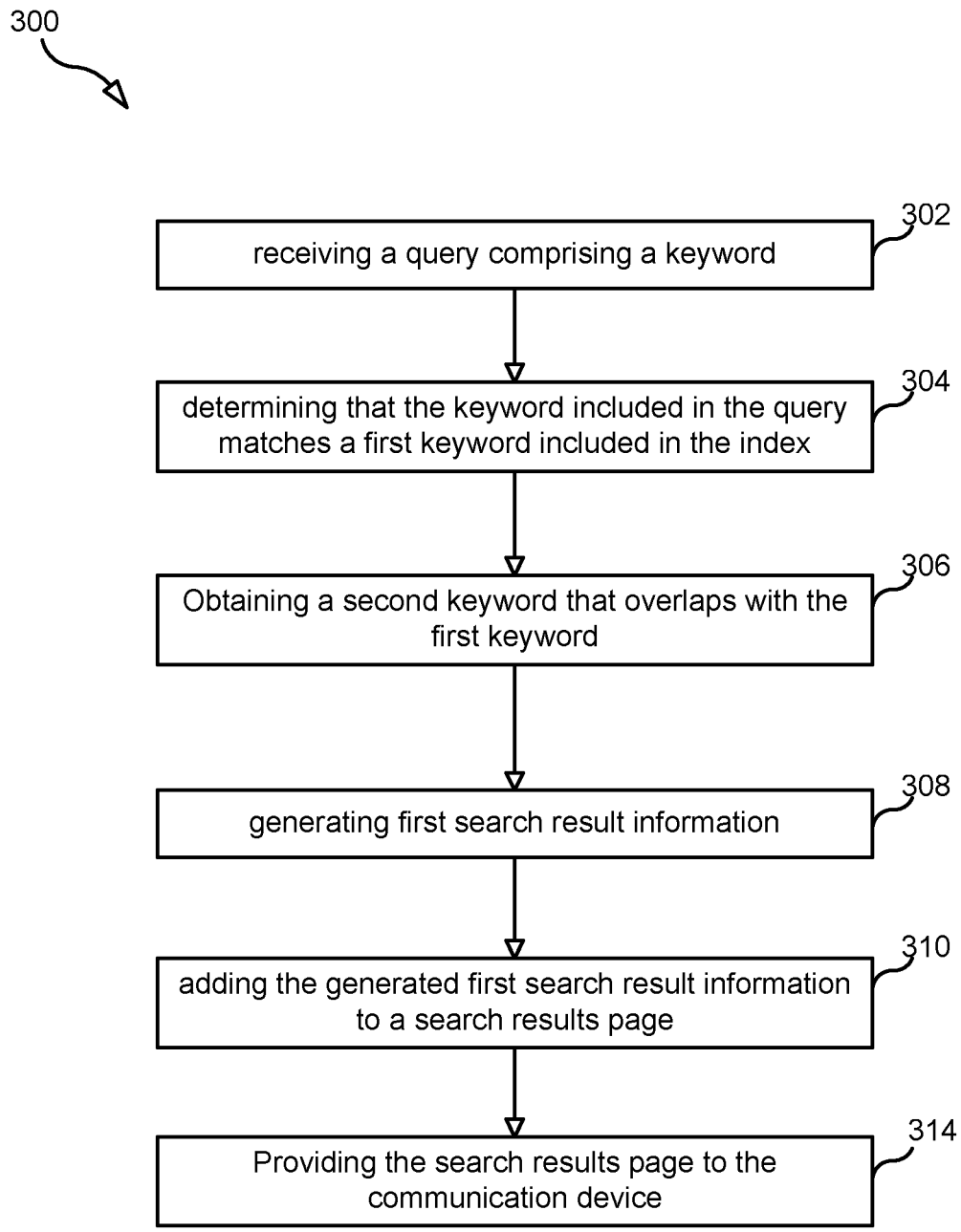
FIG. 3 is a flow chart illustrating a process, according to some embodiments, that may be performed by a query processor.

In some embodiments, the rank assigned to a keyword k depends on the modality of k and whether k overlaps with other keywords. For example, if we assume k overlaps with N other keywords, then we can use a formula of the following form to calculate the rank $R\_k$ to assign to keyword k: $R\_k=Mv\_k+Ov\_k,1+Ov\_k,2+ \ldots +Ov\_k,N$, where $Mv\_k$ is a value assigned to the modality of k and $Ov\_k,i$ is an overlap value that is dependent on the degree of overlap between the keyword k and keyword i. For instance, $Ov\_k,i$ may equal: $((k\_end-i\_start)/(i\_end-i\_start))*Mv\_i$, where $k\_end$ is the end TS value for keyword k, $i\_start$ is the start TS for keyword i, $i\_end$ is the end TS for keyword i, and $Mv\_i$ is the modality value for keyword i. Using the above formula and assuming that the modality value for keywords having a "text" modality is 5, we can calculate the rank for the keyword "intro" as follows: $R\_intro=5+((8-6)/10-6))*5=7.5$ Referring now to FIG. 3, FIG. 3 is a flow chart illustrating a process 300, according to some embodiments, of using index 106 to produce a search result in response to a query from a communication device 101 (see FIG. 1), which query could have been initiated by a user via a user interface of the communication device 101. Process 300 may be performed by query processor 108.

In step 302, query processor 108 receives a query that was input by the user into communication device and transmitted by the communication device 101 to query processor 108, where the query comprises a keyword (e.g., Obama). In some embodiments, query processor 108 includes a Hypertext Transfer Protocol (HTTP) server. Thus, in such embodiments, the user may input the basis (such as the keyword) for the query into a web page form and initiate the submission of the query to the query processor 108 in an HTTP GET message. That is, for example, the web page form may have a text input box to enable the user to input a text based query and a "search" button. When the user activates the search button after inputting into the text input field a query, the user's browser causes the communication device 101 on which the browser is running to transmit to query processor 108 an HTTP GET message that includes the text (i.e., query) that the user input into the text input box.

In step 304, query processor 108 determines that the keyword included in the query matches a first keyword (e.g., keyword 204a "Obama") included in the index 106.

In step 306, query processor 108 obtains a second keyword (e.g., keyword 204b "flag") that overlaps with the first keyword 204a (e.g., Obama). For example, query processor may obtain the second keyword 204b by retrieving from index 106 record 202a, which includes a set of keywords 214a (i.e., CNN and flag) that overlaps with the Obama keyword 204a.

In step 308, query processor 108 generates search result information, wherein the search result information comprises: a) a first locator identifying a first image file associated with the first keyword (e.g., a thumbnail image of President Obama) and a second locator identifying a second image file associated with the second keyword (e.g., a thumbnail image of a flag); and/or b) the first keyword and the keywords that overlap the first keyword (e.g., the second keyword). Query processor 108 may obtain the first and second locators from information contained in index 106. For example, while not shown, the first locator may be stored in a field of record 202a and the second locator may be stored in a field of record 202b. As another example, query processor 108 may construct the first and second locators using information contained in records 202a and 202b, respectively.

In step 310, query processor 108 adds the generated search result information to a search results page.

In step 312, query processor 108 provides the search results page to the communication device 101 which displays the page to the user. For example, the search results page may be in the form of a Hypertext Markup Language (HTML) document) and query processor may use HTTP to transmit the HTML document to the user's communication device 101 (e.g., laptop computer, smartphone, etc).

In this way, indexing and search system 100 provides the advantage of not only providing the user with information associated with the keywords contained in the user's query (e.g., Obama), but also providing to the user additional information associated with keywords (e.g., flag) that overlap the keywords of the user's query. This additional information can be very advantageous to the user because it provides additional contextual information that may enable the user to find the search result from the search results page that bests matches what the user was searching for.

Figure 4:
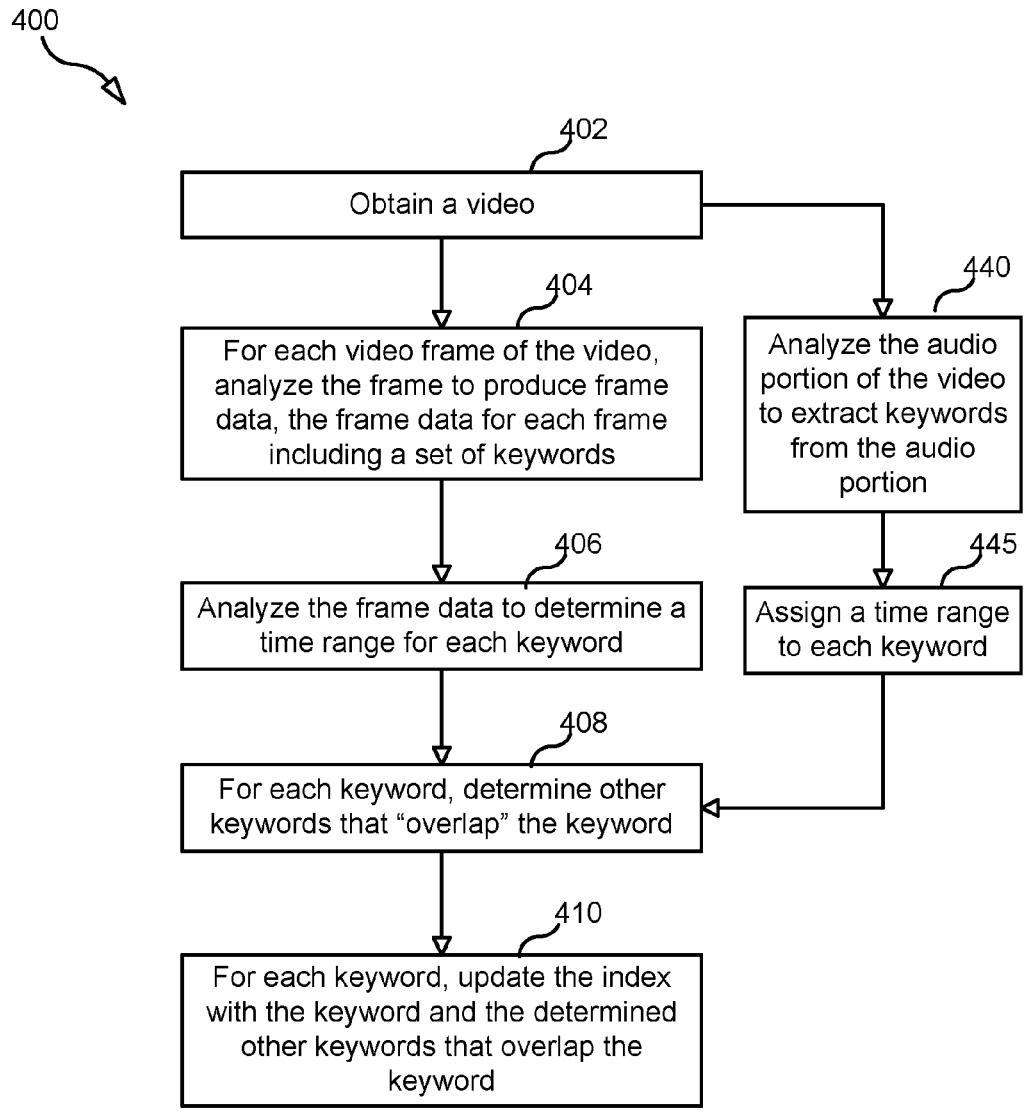
FIG. 4 is a flow chart illustrating a process, according to some embodiments, that may be performed by an indexing system.

Referring now to FIG. 4, FIG. 4 is a flow chart illustrating a set of steps 400 (a.k.a., process 400), according to some embodiments, that may be performed by indexing system 104 to create index 106. Process 400 may begin with step 402, where indexing system 104 obtains (e.g., retrieves) a video from library 102.

In step 404, indexing system 104, for each video frame of the video, analyzes the frame to produce frame data, which frame data includes a set of keywords. For example, in step 404, indexing system 104 may use image recognition software to recognize and label images found within each video frame. The label given to an image identified in a video frame becomes a keyword for that video frame. In this way, indexing system 104 generates keywords for a video.

Figure 5:
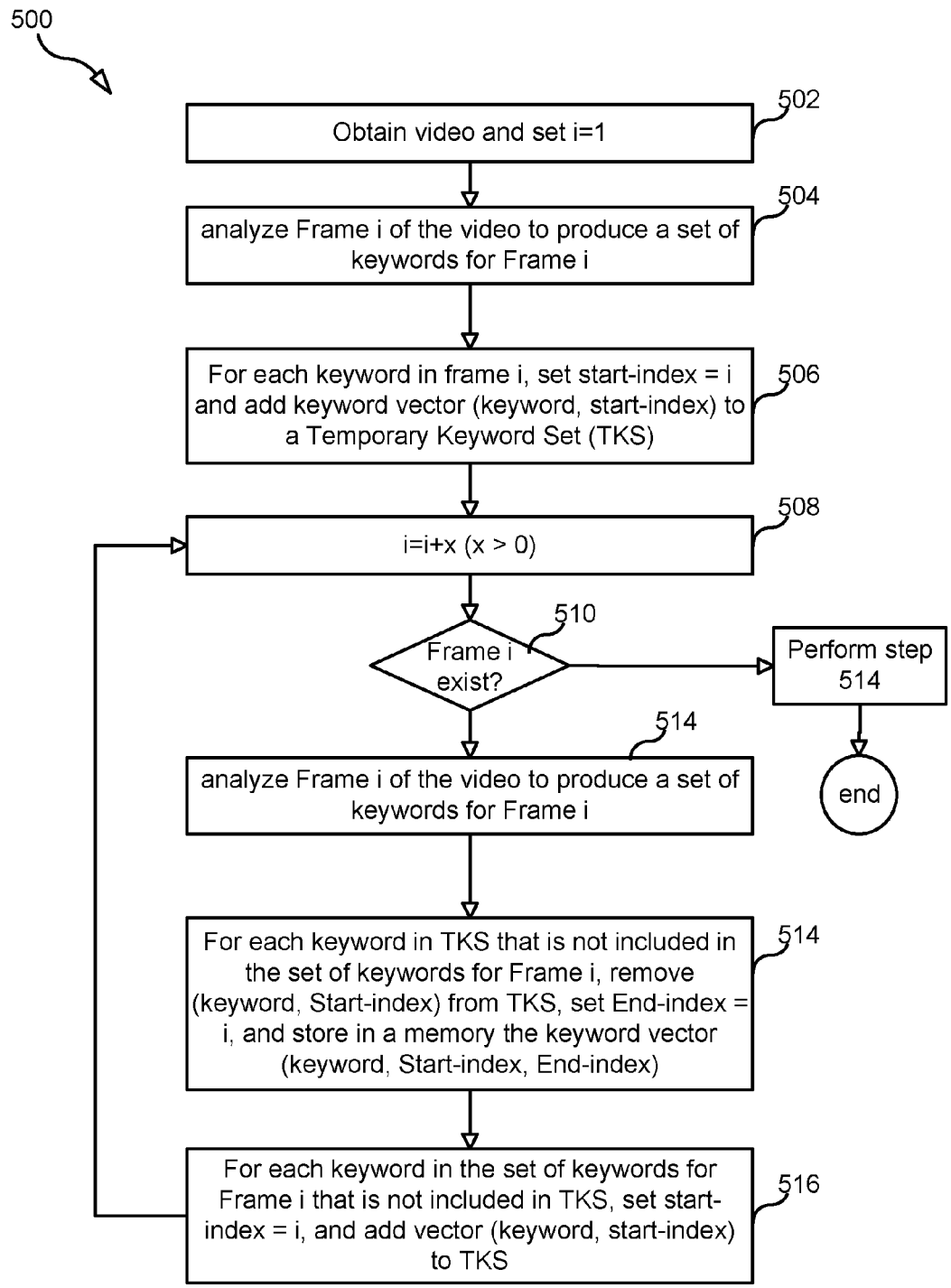
FIG. 5 is a flow chart illustrating a process, according to some embodiments, that may be performed by an indexing system.

In step 406, for each keyword obtained from performing step 404, indexing system 104 analyzes the frame data to determine for the keyword a time range (a.k.a., WoR) (e.g., a video frame range), which consists of a starting time stamp and an ending time stamp. Time may be measured in units of seconds, units of frames, or any other unit that can be used to identify a position (e.g., frame) within the video. Thus, for example, in some embodiments, a time stamp is a value having units of time (e.g., seconds), while in some other embodiments, a time stamp is a value having units of frames. FIG. 5, discussed below, illustrates a process for determining a time range for each of the keywords.

In step 440, which may be performed concurrently with one or more of steps 404-406, indexing system 104 analyzes the audio portion of the video to extract keywords from the audio portion. In step 445, indexing system 104 assign a time range to each keyword. After step 445, process 400 proceeds to step 408.

In step 408, for each keyword obtained from performing steps 404 and 440, indexing system 104 determines other keywords that "overlap" the keyword. In some embodiments, a first keyword overlaps a second keyword if there is any overlap in the time ranges for the two keywords.

In step 410, for each keyword obtained from performing steps 404 and 440, indexing system 104 updates the index 106 with the keyword and the determined other keywords that overlap the keyword. For example, in step 410, for each keyword, indexing system 104 inserts into index 106 a new record for the keyword, wherein the keyword is stored in the "keyword" field 204 of the record and the keywords that were determined to overlap with the keyword are stored in the "overlap" field 214 of the record. As shown in FIG. 2, the new record that is inserted into index 106 may also include a modality value stored in the "modality" field 206, a rank value stored in the "rank" field 212, and a video identifier value that identifies the video retrieved in step 402 in the "video id" field 216. In some embodiments, the modality value is one of: image, text, and audio. Additionally, in some embodiments, the rank value for a keyword is a value that is calculated based on, for example, one or more of: the modality associated with the keyword, the length (l) of the time range associated with the keyword (e.g., l=end time stamp−start time stamp), and the number of keywords that overlap with the keyword.

Referring now to FIG. 5, FIG. 5 is a flow chart illustrating a process 500, according to some embodiments, that may be performed by indexing system 104. Process 500 may begin with step 502, in which indexing system 104 obtains (e.g., retrieves) a video from library 102 and sets variable named "i" equal to 1. In step 504, indexing system 104 analyzes frame i of the video to produce a set of keywords for frame i.

In step 506, for each keyword in frame i, indexing system 104 sets start-index=i and adds to a Temporary Keyword Set (TKS) a keyword vector (keyword, start-index) for the keyword. In step 508, indexing system sets i equal to the value i+x, where x is a whole number greater than zero. In step 510, indexing system 104 determines whether frame i exists in the video. If it does not, then process proceeds to step 514, otherwise it proceeds to step 512. In step 512, indexing system 104 analyzes frame i of the video to produce a set of keywords for frame i.

In step 514, for each keyword vector included in TKS that does not include a keyword that is included in the set of keywords for frame i, indexing system 104 removes from TKS the keyword vector (keyword, start-index) for the keyword, sets end-index equal to the value of i, and stores in a data storage system 1206 (see FIG. 12) (e.g., a record of index 106) the keyword vector (keyword, start-index, end-index) for the keyword. In some embodiments, rather than store in data storage system 1206 the keyword vector (keyword, start-index, end-index) for the keyword, indexing system 104 stores in the data storage system 1206 the following keyword vector for the keyword: (keyword, start-index−offset1, end-index+offset2), where offset1 and offset2 are values greater than zero.

In step 516, for each keyword in the set of keywords for frame i that is not included in TKS, indexing system 104 sets start-index=i, and adds a keyword vector (keyword, start-index) for the keyword to TKS.

In the above manner, indexing system can determine a time range (e.g., a video frame range) for each keyword.

Referring now to FIG. 6, FIG. 6 illustrates an example format for index 106 according to other embodiments. The embodiment of index 106 shown in FIG. 6 differs from that shown in FIG. 2 in that the index shown in FIG. 6 does not include the "overlap" field. This is because in some embodiments, query processor 108 determines overlapping keywords in real-time in response to a query, which query may include one or more offset values in addition to one or more keywords.

Figure 7:
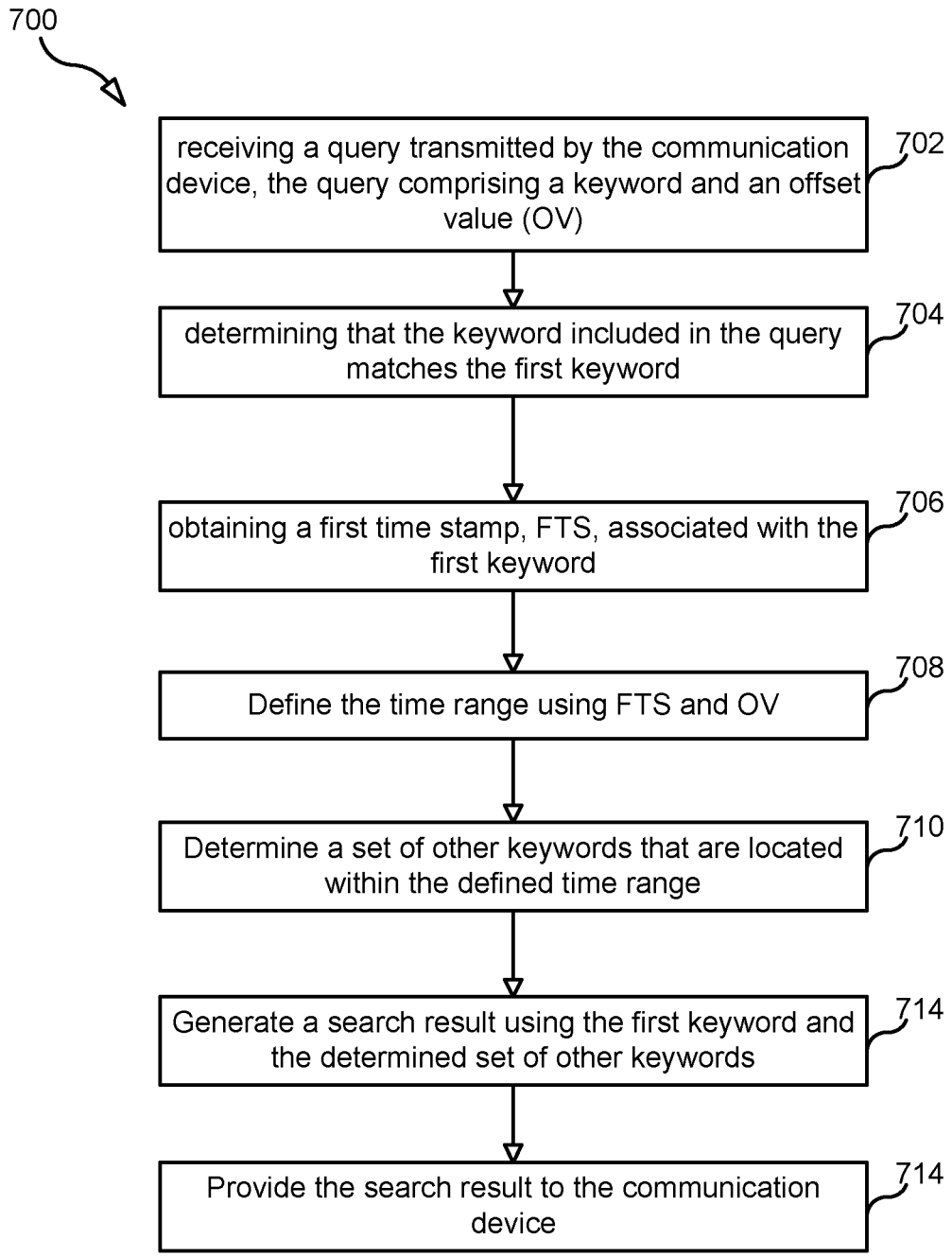
FIG. 7 is a flow chart illustrating a process, according to some embodiments, that may be performed by a query processor.

Referring now to FIG. 7, FIG. 7 is a flow chart illustrating a process 700, according to some embodiments, that may be performed by query processor 108. Process 700 may begin with step 702, in which query processor 108 receives a query transmitted by the communication device 101 (e.g., a query the user input into communication device 101), where the query includes a keyword and an offset value (OV).

In step 704, query processor 108 determines that the keyword included in the query matches a first keyword (e.g., a keyword included in index 106).

In step 706, query processor 108 obtains a first time stamp (FTS) associated with the first keyword. For example, the FTS may be a start time stamp associated with the first keyword (e.g., the start TS value that is stored in the same record of index 106 in which the first keyword is stored).

In step 708, query processor 108 defines the time range using FTS and OV. For example, the time range may be defined by a start time stamp and an end time stamp, where the start time stamp is equal to (FTS−OV) and an end time stamp is equal to a second time stamp (STS) plus OV (i.e., STS+OV). STS may be an end time stamp associated with the first keyword.

In step 710, query processor 108 determines a set of keywords other than the first keyword that are located within the defined time range. That is, as described above, the keywords that overlap with the first keyword are found using, for example, the start and end time range values stored in index 106.

In step 712, query processor 108 generates a search result using the first keyword and the determined set of other keywords. In step 714, query processor 108 provides the search result to the communication device 101.

In the above manner, the overlapping keywords are determined in real-time in response to a query.

Figure 8:
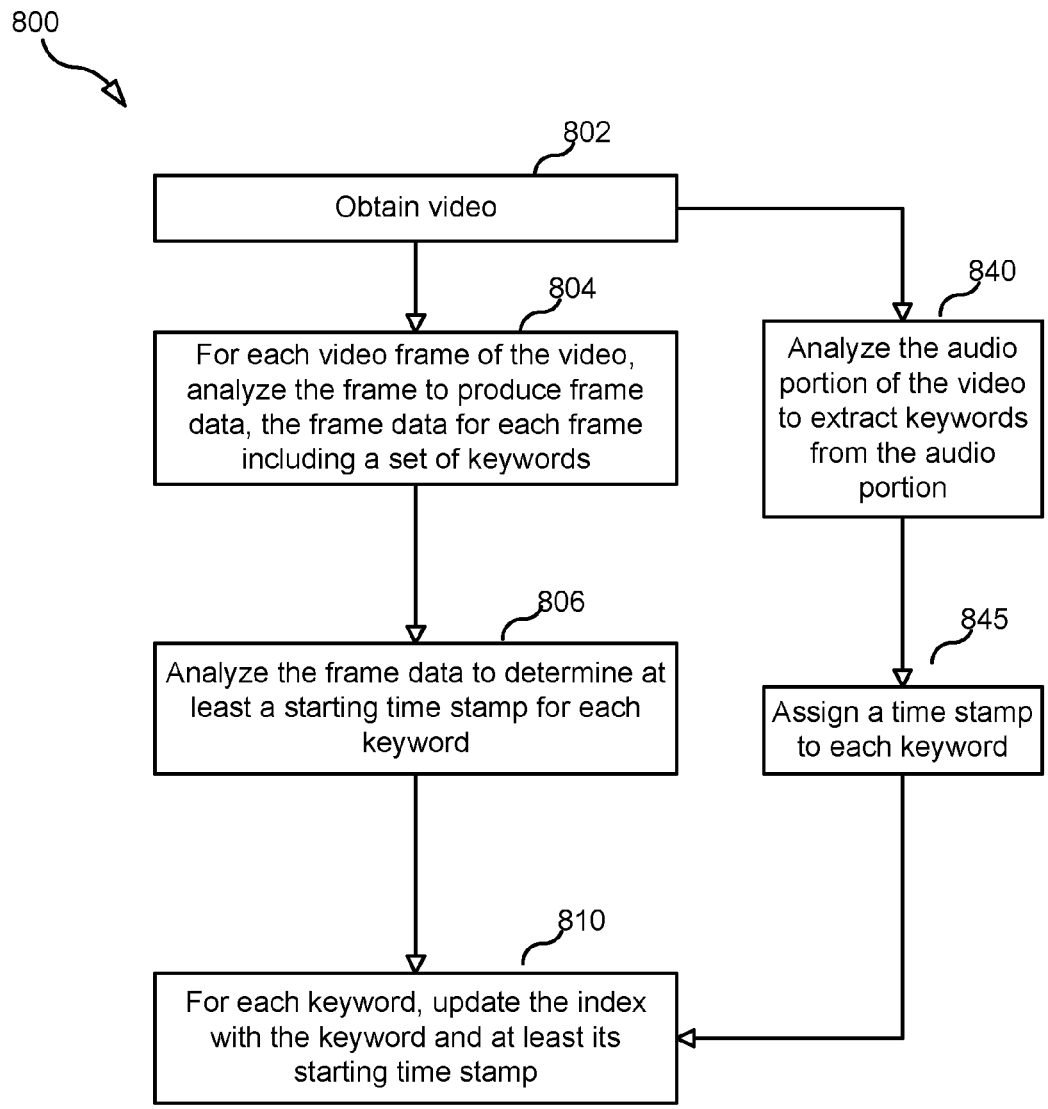
FIG. 8 is a flow chart illustrating a process, according to some embodiments, that may be performed by an indexing system.

FIG. 8 is a flow chart illustrating a process 800 according to some embodiments, that may be performed by indexing system 104 to create the index 106 shown in FIG. 6. Process 800 may begin with step 802, where indexing system 104 obtains (e.g., retrieves) a video from library 102.

In step 804, indexing system 104, for each video frame of the video, analyzes the frame to produce frame data, which frame data includes a set of keywords. For example, in step 804, indexing system 104 may use image recognition software to recognize and label images found within each video frame. The label given to an image identified in a video frame becomes a keyword for that video frame.

In step 806, for each keyword obtained from performing step 804, indexing system 104 analyzes the frame data to determine for the keyword at least a starting time stamp. In some embodiments, for each keyword, indexing system 104 determines a starting and an ending time stamp for the key word.

In step 840, which may be performed concurrently with one or more of steps 804-806, indexing system 104 analyzes the audio portion of the video to extract keywords from the audio portion. In step 845, indexing system 104 assigns a starting time stamp to each of the extracted keywords from step 840. After step 845, process 800 proceeds to step 810.

In step 810, for each keyword obtained from performing steps 804 and 840, indexing system 104 updates the index 106 with the keyword and at least the keyword's starting time stamp. For example, in step 810, for each keyword, indexing system 104 inserts into index 106 a new record for the keyword, wherein the keyword is stored in the "keyword" field 204 of the record, the starting time stamp is stored in the "start TS" field 208, and, if an ending time stamp exists, the ending time stamp is stored in the "end TS" field 210. As shown in FIG. 6, the new record that is inserted into index 106 may also include a modality value stored in the "modality" field 206, a rank value stored in the "rank" field 212, and a video identifier value that identifies the video retrieved in step 802 in the "video id" field 216. In some embodiments, the modality value is one of: image, text, and audio. Additionally, in some embodiments, the rank value for a keyword is a value that is calculated based on, for example, the modality associated with the keyword and/or the length (l) of the time range associated with the keyword (e.g., l=ending time stamp−starting time stamp).

As explained upon above, a feature of various embodiments is an algorithm that extracts and indexes keywords within a window of relevance (WoR). The WoR is in one embodiment set for each key word, t(keyword)±t(WoR), wherein t(keyword) is a time stamp associated with a tag/keyword in e.g. a multimedia content, such as a video, and t(WoR) is a time, which may be fixed for all modalities, fixed but different for different modalities, such as one t(WoR) value for features/faces in images/frames in a video and another value for derived keywords from speech and still another value for derived keywords from sound and yet another value for text (such as derived words from subtitles). Other ways of setting the WoR than fixed values in the above mentioned way, may be to set it more dynamic so that at least one other keyword comes within the window of relevance, so that it is easily enabled that at least one keyword is displayed in a search result list adjacent to the main keyword, which in its turn may be highlighted to make it easier for the user to judge the relevance of the hit in the result list or result view.

The WoR may in some embodiments also be made to be dependent on the type of keyword itself or a general tag associated with the content. An action movie might for example be made to have different window of relevance than e.g. a romantic, slow paced movie, whereas talk shows may have still another set of values for the WoR. Yet other ways of setting the WoR is to make it dependent on whether the keyword is present in more than one modality at the same time, e.g. has a rank value above a certain threshold, and/or dependent on the length of the video.

In some embodiments, the algorithm included into the indexing process enables an improvement of the search capabilities for audio visual content. The indexing and window of relevance algorithm here, in some embodiments, takes a given number of frames per second in a video and processes each frame as an image. The images are then analyzed for metadata like text (using e.g. OCR), faces (using face detection algorithms), voice, objects and other metadata and could in some embodiments be combined with manual tagging of the content. All metadata will be indexed, see FIG. 9, which comprises some steps performed at least partly by the algorithm.

Figure 9:
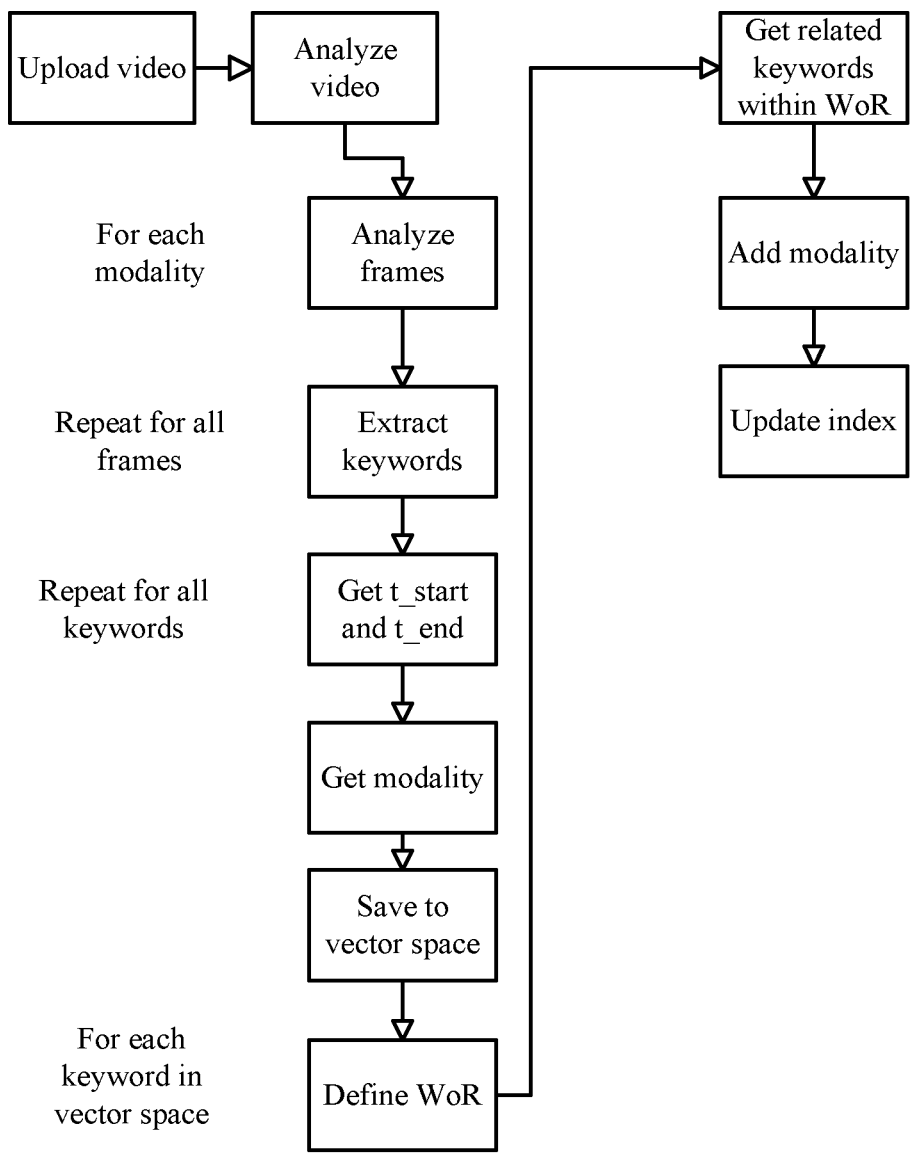
FIG. 9 is a flow chart illustrating a process, according to some embodiments, that may be performed by an indexing system.

As illustrated in FIG. 9, a method according to an embodiment may include the following features:

I. A multimedia content, in this example a video, is captured or uploaded to a server, e.g. the ISS.

II. The WoR algorithm start analyzing the uploaded video, e.g. already when the uploading is made, and in the following way:

a) For each modality (image, voice, text, sound etc) analyze each frame in the video:

i) For each frame:

1. Extract keywords, and for each one of the keywords an associated modality as well as at least one time stamp, t_start and optionally also a second associated time stamp t_end. In one embodiment there may, for example, be a first time stamp and a second time stamp associated with a person whose face is included in a video stream for during a certain time of the video. The two values may typically be when the person first "enters the screen" and the second value when the person is not visible any more. Spoken words derived from speech or subtitles may on the other hand be associated with just the first time stamp. Background sound, such as a song or soundtrack typically is rather long and may therefore with advantage be associated with a first and a second time stamp.

2. Save data to Vector Space, i.e typically a Random-access memory used as intermediate memory before data is stored in the database. For example, a json-file (.json) including keywords, related times and modality is created and uploaded to the Vector Space. Here the data may be sorted according to the first time stamp.

ii) For each keyword in Vector Space/RAM:

1) Rank keyword (modality): e.g. rank keyword according to the associated modality.
2) Define WoR, i.e. a time range for the keyword
3) Add/associate/link related keywords within WoR to the keyword
4) Add modality: add modality value/score.
5) Update database, which in one embodiment is an SQL database.
6) Update Index, wherein the index in one embodiment is comprised in the commercially available search engine software Lucene which run on the commercially available search platform Apache Solr. Every update can in this "Apache" embodiment be what in that use case normally is called a document.

The steps define WoR, Add related keywords and add modality builds up the meta data and the structure for the data which shall be inserted into the database. In the Add modality step, it is defined what you actually intends to store in the database, such as info indicating modality and what the rank value is for that modality, but in some embodiments it may be sufficient with only indicating the rank value if there is no need to indicate modality in the index and/or database. In case json-files are created, the json-files may be aggregated and kept in the vector space and sorted according to the first time stamp. Crosslinking can be done to provide the ranking and matching keywords. In preparation for at least one of the two next updating steps, there may in one embodiment in practice be that a new list is created and which include ranking and modality is included and wherein every row is formatted with every first time stamp.

In case of a video and persons tagged in the video, the algorithm may find a certain amount of people in the video and it may be checked if the person shows up in a plurality of times in the video (plurality=more than one). The ranking of the person/object in the index can then be made dependent on how long the person/object is visible in the movie and even get a higher ranking if he/she/it is mentioned or talks a lot in the movie.

Index 106 shown in FIG. 2 illustrates an example of data stored in the index. Here there is a row for each keyword/tag and each row includes a field for the keyword itself or an ID for a keyword, data indicating modality (such as text, speech, image, sound), the actual start time of the WoR, the actual end time of the WoR (where time zero would be at the very beginning of the video), rank associated with the keyword (where the rank is dependent on modality and optionally also other parameters as disclosed in US Publication No. 2013/0226930), matching keywords or their ID, and the related video_id. Optionally, there may also be a column for at least the first time stamp t_start, but may also include the second time stamp t_end.

Hence, when a search is made for the keyword "Obama", the index table displaying the most relevant hits in the GUI in e.g. a web browser connecting to the indexing and search system 100, may also display e.g. adjacent to a highlighted word "Obama" or a picture of Mr President Obama taken from the video (to more readily show that Obama is actually visible in that hit and not only talked about etc) display the text "CNN". By displaying CNN next to the picture of Mr President Obama, the searcher should be able to more readily guess the context and relevance of the video in relation to what is actually searched for.

Another, somewhat different embodiment is described in the following:

The window of relevance algorithm is here included in the search function, e.g. as an added feature to an existing query processor 108 (a.k.a., search engine). In this case the window of relevance can be set by the user via a GUI in the communication device 101, such as a User Equipment like a tablet, mobile phone, laptop, or a communications device embedded in a vehicle i, and be modified for each search query. FIG. 7 illustrates an example process according to this embodiment.

In this embodiment the indexing table/index contains all key words, modalities and time stamps according to the example below.

The algorithm here analyzes videos that have been or is currently being uploaded to the server. For example, if a video is currently being uploaded, the algorithm is run by the server or the UE and here looks and tries to recognize faces and text and optionally also for sound. A json-file (.json) including keywords, related times and modality is created.

In a first step, the communication device 101 submits a search query to the server.

In steps 2-3, the server run another part of the WoR algorithm on the query results
  a) The query results consist of a ranked list of matching keywords, t_start, and modality
  b) For each keyword in list
    i) Define WoR by: WoR=(t_start−t(WoR), t_end+t(WoR) or WoR=t_start+/−t(WoR). The WoR may as mentioned above be dependent on modality and whether t_end is used for that modality.
    ii). Fetch related keywords from index table within WoR for said keyword
    iii) Add related keywords to result list
      1. Associated to said keyword
      2. View its modality (e.g. in order to enable decision for how the related keywords and/or the keyword should be presented)
  c) Optionally keywords which are included in overlapping WoRs may be boosted in rank.

In step 3, return updated ranked list of search results.

The embodiments described herein may enable detailed and precise search of audio visual content.

Figure 10:
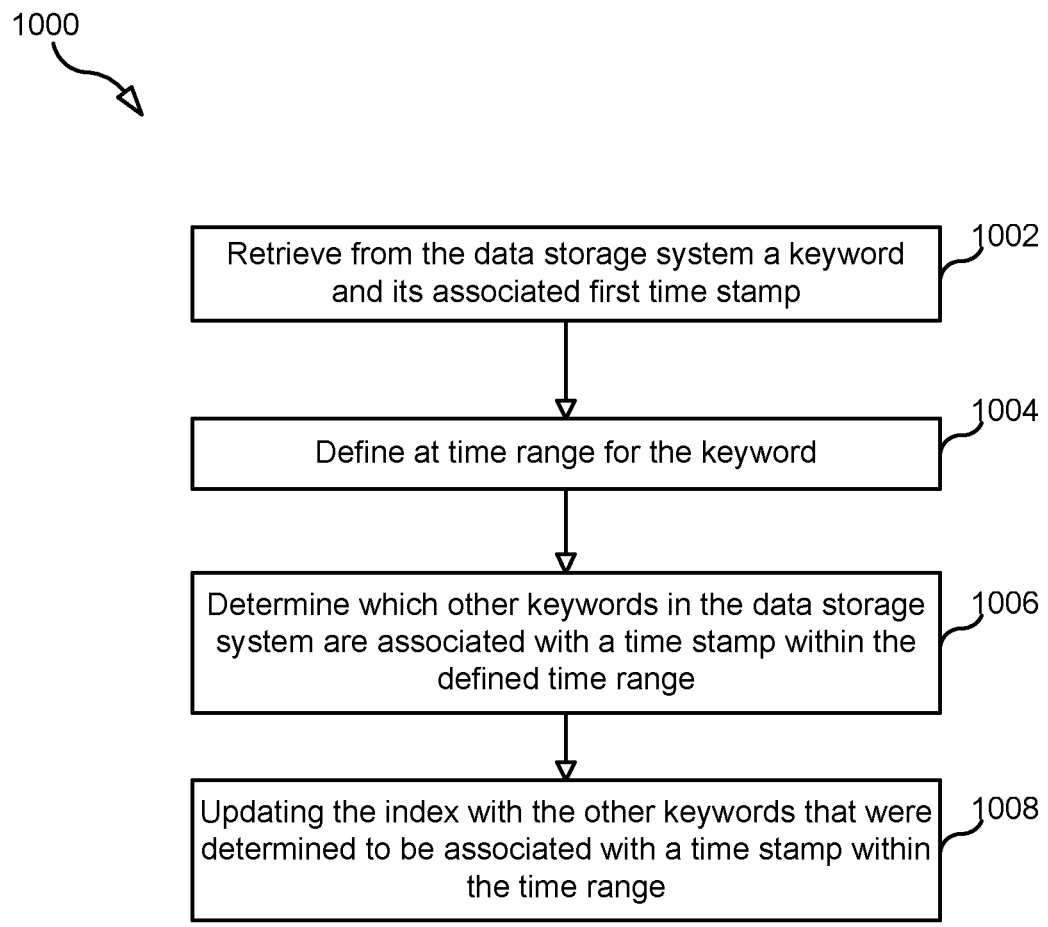
FIG. 10 is a flow chart illustrating a process, according to some embodiments, that may be performed by an indexing system.

Referring to FIG. 10, a method 1000 performed by a computer system, such as the indexing system 104 or the indexing and search system 100, for indexing or updating an index for multimedia content, (and optionally also ranking and displaying search results upon a search request for multimedia content), the method comprising for each one of a plurality of keywords in a memory (a.k.a., data storage system 1206) (e.g. the vector space above), wherein each keyword is associated with a modality and at least one time stamp:

retrieving from the data storage system 1206 the keyword and the at least one time stamp (step 1002), define a time range (WoR) for the keyword (step 1004), determining if there are other keywords in the data storage system 1206 which are associated with a time stamp within the time range (i.e., determine which other keywords in the data storage system 1206 are associated with a time stamp within the defined time range) (step 1006), updating index 106 with, for each one of the keywords in the data storage system 1206, found other keywords with time stamps (matching keywords) within the time range (step 1008).

The method may also comprise updating the index and/or database with a rank value and modality of each one the other keywords with time stamps within the time range (i.e. the matching keywords).

Figure 11:
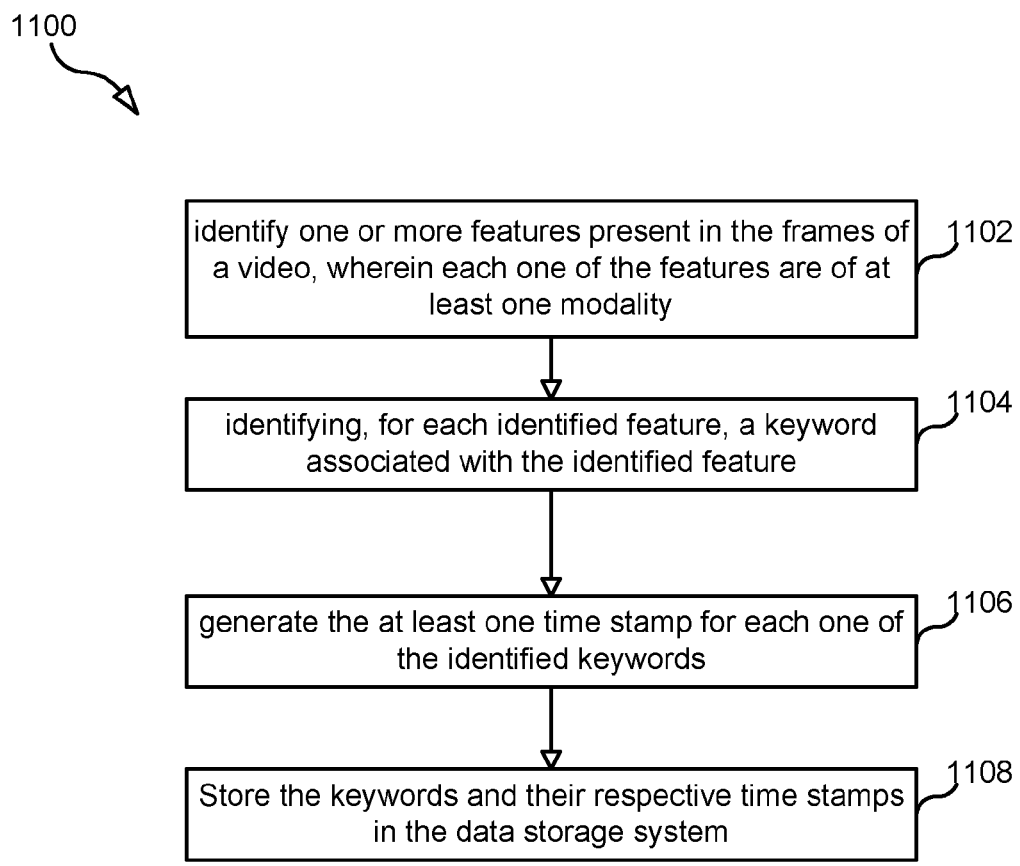
FIG. 11 is a flow chart illustrating a process, according to some embodiments, that may be performed by an indexing system.

Referring to FIG. 11, the method may comprise the following steps performed by the computer system before the step of retrieving the keyword from the data storage system 1206, on at least a plurality of frames of a video:

identifying one or more features present in the frames, wherein each one of the features are of at least one modality/media type (step 1102);

identifying, for each identified feature, one or more respective keywords associated with the identified feature (step 1104);

generating the at least one time stamp for each one of the identified keywords (step 1106); and storing the keywords and their respective relevances and time stamps in the data storage system 1206 (step 1108).

The method may further include determining, for each identified keyword associated with an identified feature, a respective relevance of the keyword, wherein the respective relevance is dependent on a weight associated with the respective modality/media type of the identified feature.

The time range may be defined as starting a certain time before the time of the first time stamp and ending the certain time after the first time stamp. The time range, may alternatively, e.g. for images, start a certain time before the time of the first time stamp and end the certain time after a second time stamp associated with the keyword.

Apparatus, computer program and computer program products corresponding to the embodiment illustrated by the method is disclosed by the above disclosure. An embodiment of an apparatus, such as a server/server device/server host, may correspondingly be said to be a server device comprising a processor and memory, said memory containing instructions executable by said processor whereby said server device is operative to, for each one of a plurality of keywords in the memory, wherein each keyword is associated with a modality and at least one time stamp: retrieve the keyword and the at least one time stamp from the memory or the second memory; define a time range (WoR) for the keyword; determine if there are other keywords in the memory which are associated with a time stamp within the time range; and update an index and/or a database with, for each one of the keywords in the memory, found other keywords with time stamps (matching keywords) within the time range.

The memory should above not be seen as comprising just one memory, but should also be interpreted as also comprising embodiments where two or more memories are utilized, for example when the instructions are stored in one physical memory part and the keywords and time stamps etc are stored in another memory part in the server device.

Figure 12:
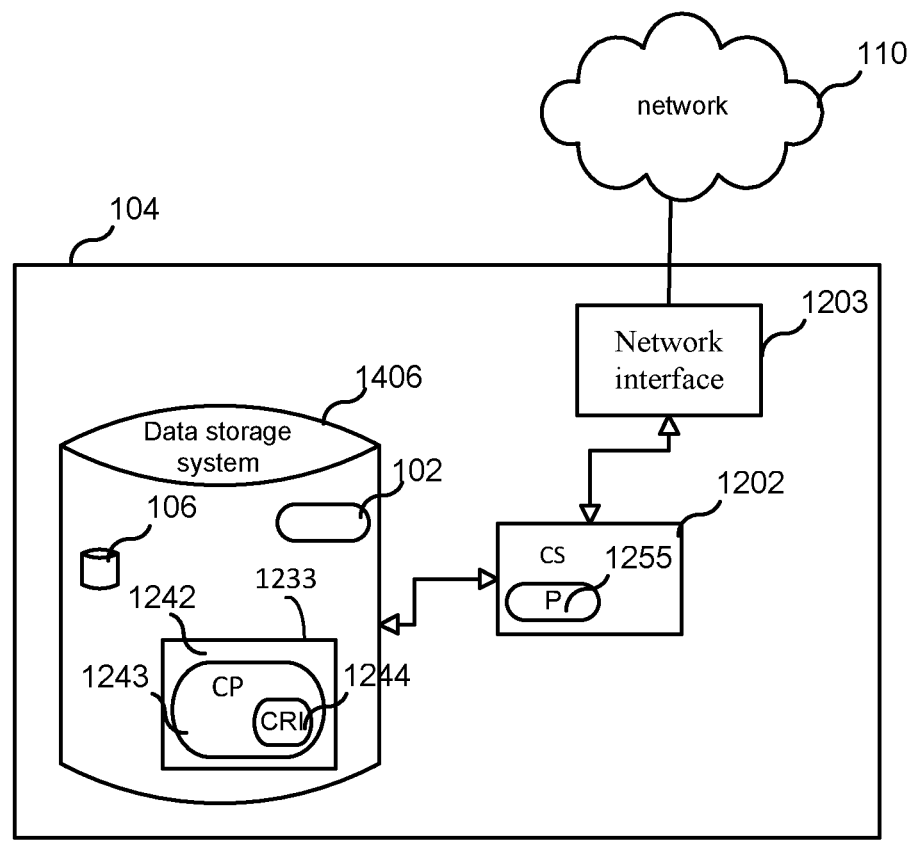
FIG. 12 is a block diagram of an indexing system according to some embodiments.

FIG. 12 is a block diagram of an embodiment of indexing system 104. As shown in FIG. 12, indexing system 104 may include or consist of: a computer system (CS) 1202, which may include one or more processors 1255 (e.g., a general purpose microprocessor) and/or one or more circuits, such as an application specific integrated circuit (ASIC), field-programmable gate arrays (FPGAs), a logic circuit, and the like; a network interface 1203 for use in connecting indexing system 104 to a network 110 (e.g., the Internet or other network); and a data storage system 1206 (also referred to as "memory"), which may include one or more non-volatile storage devices and/or one or more volatile storage devices (e.g., random access memory (RAM)). In embodiments where indexing system 104 includes a processor 1255, a computer program product (CPP) 1233 may be provided. CPP 1233 includes or is a computer readable medium (CRM) 1242 storing a computer program (CP) 1243 comprising computer readable instructions (CRI) 1244. CRM 1242 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1244 of computer program 1243 is configured such that when executed by computer system 1202, the CRI 1244 causes the indexing system 104 to perform steps described above (e.g., steps described above with reference to the flow charts shown in the drawings). In other embodiments, indexing system 104 may be configured to perform steps described herein without the need for a computer program. That is, for example, computer system 1202 may consist merely of one or more ASICs. Hence, the features of the embodiments described herein may be implemented in hardware and/or software.

Figure 13:
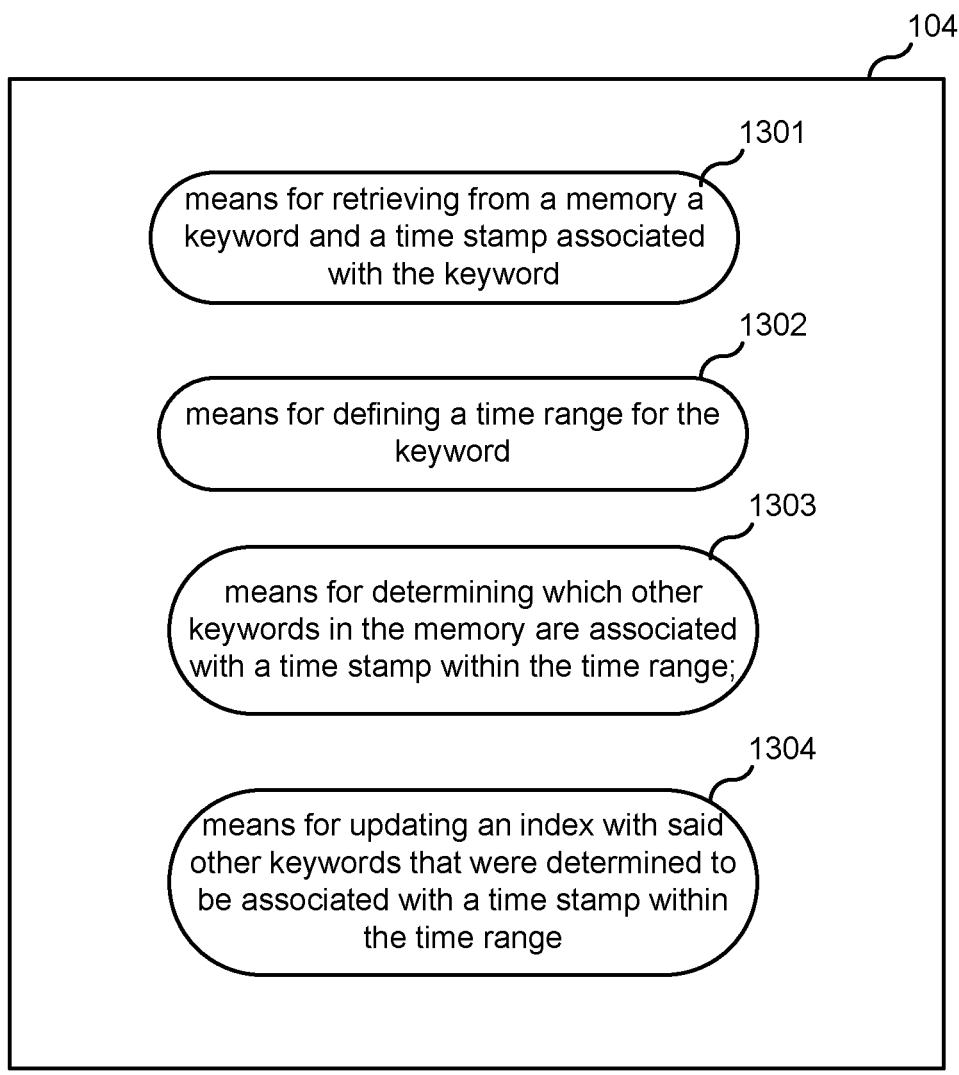
FIG. 13 is a diagram illustrating components of an indexing system according to some embodiments.

FIG. 13 is a functional block diagram illustrating components of indexing system 104, according to some embodiments. As illustrated in FIG. 13, in some embodiments, indexing system 104 includes: means 1301 for retrieving from a memory a keyword and a time stamp associated with the keyword; means 1302 for defining a time range for the keyword; means 1303 for determining which other keywords in the memory are associated with a time stamp within the time range; and means 1304 for updating an index with said other keywords that were determined to be associated with a time stamp within the time range.

Figure 14:
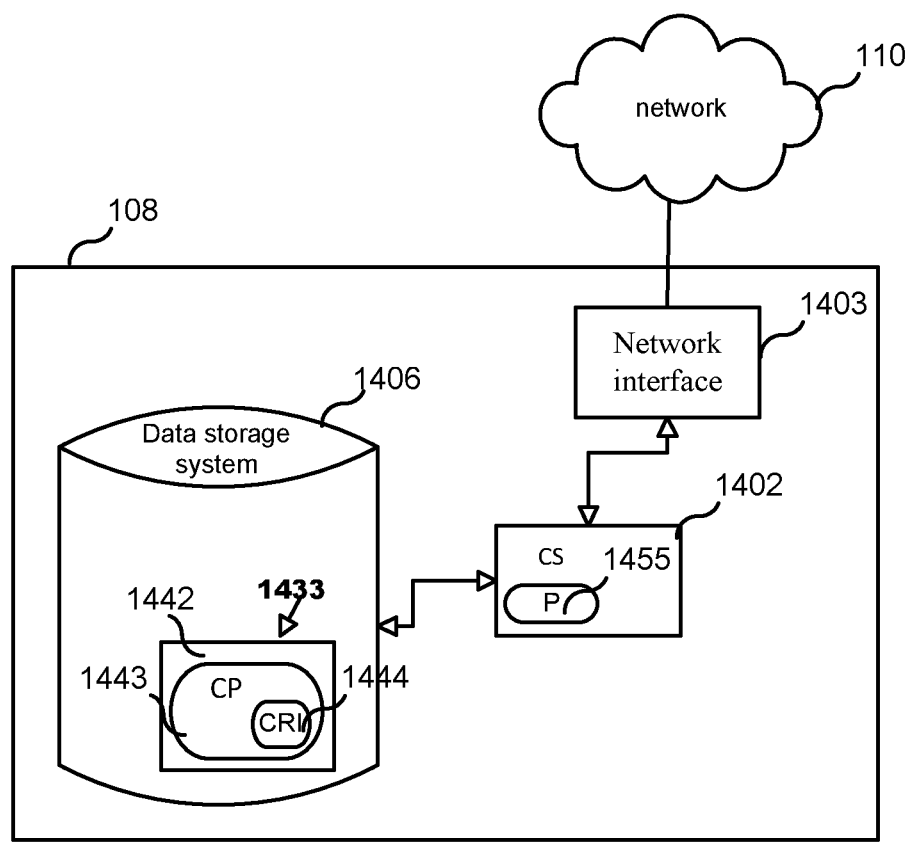
FIG. 14 is a block diagram of a query processor according to some embodiments.

FIG. 14 is a block diagram of an embodiment of query processor 108. As shown in FIG. 14, query processor 108 may include or consist of: a computer system (CS) 1402, which may include one or more processors 1455 (e.g., a general purpose microprocessor) and/or one or more circuits, such as an application specific integrated circuit (ASIC), field-programmable gate arrays (FPGAs), a logic circuit, and the like; a network interface 1403 for use in connecting query processor 108 to a network 110 (e.g., the Internet or other network); and a data storage system 1406, which may include one or more non-volatile storage devices and/or one or more volatile storage devices (e.g., random access memory (RAM)). In embodiments where query processor 108 includes a processor 1455, a computer program product (CPP) 1433 may be provided. CPP 1433 includes or is a computer readable medium (CRM) 1442 storing a computer program (CP) 1443 comprising computer readable instructions (CRI) 1444. CRM 1442 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1444 of computer program 1443 is configured such that when executed by computer system 1402, the CRI causes the query processor 108 to perform steps described above (e.g., steps described above with reference to the flow charts shown in the drawings). In other embodiments, query processor 108 may be configured to perform steps described herein without the need for a computer program. That is, for example, computer system 1402 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by an indexing system for updating an index based on a video, the method comprising:

automatically detecting a first feature within a first video frame of the video or within a first audio component of the video;

identifying a first keyword associated with the identified first feature;

defining a first time range for the first keyword based on a time stamp identifying the first video frame or the first audio component;

automatically detecting a second feature within a second video frame of the video or within a second audio component of the video;

identifying a second keyword associated with the identified second feature;

defining a second time range for the second keyword based on a time stamp identifying the second video frame or the second audio component;

determining that the second keyword overlaps with the first keyword, wherein the determining comprises determining that there is an overlap between the first time range and the second time range; and updating the index, wherein updating the index comprises adding to the index information indicating that the second keyword overlaps with the first keyword.

2. The method of claim 1, further comprising:
updating the index with a rank value and modality of each one said determined other keywords with time stamps within the time range.

3. The method of claim 1 further comprising, before the step of retrieving the keyword from the data storage system, on at least a plurality of frames of a video:
identifying one or more features present in the frames, wherein each one of the features are of at least one modality;
identifying, for each identified feature, a keyword associated with the identified feature;
generating the at least one time stamp for each one of the identified keywords; and
storing the keywords and their respective time stamps in the data storage system.

4. The method of claim 1, wherein the time range is defined as starting a certain time before the time of the first time stamp and ending a certain time after the first time stamp.

5. The method of claim 1, wherein the keyword is further associated with a second time stamp and the time range starts a certain time before the time of the first time stamp and ends a certain time after the second time stamp.

6. An indexing system, comprising:
a computer system; and
a data storage system, said data storage system containing computer readable instructions executable by said computer system whereby said indexing system is operative to:
detect a first feature within a first video frame of a video or within a first audio component of the video;
identify a first keyword associated with the identified first feature;
define a first time range for the first keyword based on a time stamp identifying the first video frame or the first audio component;
detect a second feature within a second video frame of the video or within a second audio component of the video;
identify a second keyword associated with the identified second feature;
define a second time range for the second keyword based on a time stamp identifying the second video frame or the second audio component;
determine that the second keyword overlaps with the first keyword, wherein the determining comprises determining that there is an overlap between the first time range and the second time range; and
add to an index information indicating that the second keyword overlaps with the first keyword.

7. The indexing system of claim 6, wherein said apparatus is further operative to update the index with a rank value and modality of each one the other keywords with time stamps within the time range.

8. The indexing system of claim 6, wherein said indexing system is further operative to, before the step of retrieving the keyword from the data storage system, on at least a plurality of frames of a video:
identify one or more features present in the frames, wherein each one of the features are of at least one modality;
identify, for each identified feature, one or more respective keywords associated with the identified feature;
generate the at least one time stamp for each one of the identified keywords; and
store the keywords and their respective time stamps in the data storage system.

9. The indexing system of claim 6, wherein the time range is defined as starting a certain time before the time of the first time stamp and ending the certain time after the first time stamp.

10. The indexing system of claim 6, wherein the keyword is further associated with a second time stamp and the time range starts a certain time before the time of the first time stamp and ends a certain time after the second time stamp.

11. A computer program product comprising a non-transitory computer readable medium storing a computer program for indexing content, the computer program comprising computer readable instructions which when run on a computer system causes the computer system to:
detect a first feature within a first video frame of a video or within a first audio component of the video;
identify a first keyword associated with the identified first feature;
define a first time range for the first keyword based on a time stamp identifying the first video frame or the first audio component;
detect a second feature within a second video frame of the video or within a second audio component of the video;
identify a second keyword associated with the identified second feature;
define a second time range for the second keyword based on a time stamp identifying the second video frame or the second audio component;
determine that the second keyword overlaps with the first keyword, wherein the determining comprises determining that there is an overlap between the first time range and the second time range; and
add to an index information indicating that the second keyword overlaps with the first keyword.

12. The computer program product of claim 11, wherein said computer readable instructions are further configured, when run, to cause the computer system to update the index with a rank value and modality of each one the other keywords with time stamps within the time range.

13. The computer program product of claim 11, wherein said computer readable instructions are further configured, when run, to cause the computer system to, before the step of retrieving the keyword from the data storage system, on at least a plurality of frames of a video:
identify one or more features present in the frames, wherein each one of the features are of at least one modality;
identify, for each identified feature, one or more respective keywords associated with the identified feature;
generate the at least one time stamp for each one of the identified keywords;
determine, for each identified keyword associated with an identified feature, a respective relevance of the keyword, wherein the respective relevance is dependent on a weight associated with the respective modality of the identified feature; and
store the keywords and their respective relevances and time stamps in the data storage system.

14. The computer program product of claim 11, wherein the time range is defined as starting a certain time before the time of the first time stamp and ending the certain time after the first time stamp.

15. The computer program product of claim 11, wherein the keyword is further associated with a second time stamp and the time range starts a certain time before the time of the first time stamp and ends a certain time after the second time stamp.

16. An indexing system for indexing or updating an index for content, comprising:
    a data storage system; and
    a data processor coupled to the data storage system, the data processor being configured to:
    detect a first feature within a first video frame of a video or within a first audio component of the video;
    identify a first keyword associated with the identified first feature;
    define a first time range for the first keyword based on a time stamp identifying the first video frame or the first audio component;
    detect a second feature within a second video frame of the video or within a second audio component of the video;
    identify a second keyword associated with the identified second feature;
    define a second time range for the second keyword based on a time stamp identifying the second video frame or the second audio component;
    determine that the second keyword overlaps with the first keyword, wherein the determining comprises determining that there is an overlap between the first time range and the second time range; and
    add to an index information indicating that the second keyword overlaps with the first keyword.

17. A content indexing method performed by an indexing and search system, the method comprising:
    automatically detecting a first feature within a first video frame of a video or within a first audio component of the video;
    identifying a first keyword associated with the identified first feature;
    automatically detecting a second feature within a second video frame of the video or within a second audio component of the video;
    identifying a second keyword associated with the identified second feature;
    storing in a data storage system the first and second keywords;
    defining a time range for the first keyword;
    after defining the time range for the first keyword, determining that the second keyword falls within the defined time range; and
    in response to determining that the second keyword falls within the defined time range, updating a first set of keywords by adding the second keyword to the first set of keywords, wherein the first set of keywords is associated with the first keyword.

18. The method of claim 17, further comprising:
    further in response to determining that the second keyword falls within the defined time range, updating a second set of keywords by adding the first keyword to the second set of keywords, wherein the second set of keywords is associated with the second keyword.

19. The method of claim 17, wherein the method further comprises:
    receiving a query comprising a keyword; and
    determining that the keyword included in the query matches the first keyword;
    in response to determining that the keyword included in the query matches the first keyword, using the first keyword to obtain the first set of keywords;
    generating first search result information, wherein the first search result information comprises the first keyword and one or more keywords from the first set of keywords; and
    adding the generated first search result information to a search results page.

20. The method of claim 17, wherein
    the method further comprises:
    receiving a query comprising a keyword;
    determining that the keyword included in the query matches the first keyword;
    in response to determining that the keyword included in the query matches the first keyword, using the first keyword to obtain the second keyword;
    generating first search result information using the first keyword and the obtained second keyword, wherein the first search result information comprises a first locator identifying a first image file associated with the first feature and a second locator identifying a second image file associated with the second feature; and
    adding the generated first search result information to a search results page.

21. The method of claim 20, wherein the first image files contains an image of the first feature and the second image files contains an image of the second feature.

22. The method of claim 17, wherein defining a time range for the first keyword comprises:
    determining a sequence of frames of the video in which a feature associated with the first keyword appears in each frame of the sequence of frames;
    determining a first time stamp assigned to the first frame of the sequence of frames;
    determining a second time stamp assigned to the last frame of the sequence of frames;
    using the first time stamp and the second time stamp to define the time range.

23. The method of claim 22, wherein
    the time range is defined by a calculated starting time value and a calculated ending time value, and
    using the first time stamp and the second time stamp to define the time range comprises calculating the starting time value by summing the first time stamp and a first offset value and calculating the ending time value by summing the second and a second offset value.

24. The method of claim 23, wherein the first index value is a first frame number or a first time index and the second index value is a second frame number or a second time index.

25. The method of claim 17, furtherer comprising:
    receiving a query comprising a keyword and an offset value;
    determining that the keyword included in the query matches the first keyword;
    defining the time range for the first keyword in response to determining that the keyword included in the query matches the first keyword;
    determining a set of other keywords that are located within the defined time range; and
    generating a search result using the first keyword and the determined set of other keywords, wherein
    defining the time range for the first keyword comprises obtaining a first index value associated with the first keyword and using the first index value associated with the first keyword and the offset value to define the time range.

26. The method of claim 25, wherein using the first index value, FIV, and the offset value, OV, to define the time range comprises computing (FIV+OV), wherein FIV defines the beginning of the time range and (FIV+OV) defines the end of the time range.

27. The method of claim 25, wherein
defining the time range for the first keyword further comprises obtaining a second index value associated with the first keyword and using the first index value, the second index value, and the offset value to define the time range.

28. The method of claim 27, wherein using the first index value, FIV, the second index value, SIV, and the offset value, OV, to define the time range comprises:
   computing (FIV−OV); and
   computing (SIV+OV), wherein
   (FIV−OV) defines the beginning of the time range, and
   (SIV+OV) defines the end of the time range.

29. An indexing and search system adapted to perform the method of claim 17.

* * * * *